United States Patent
Nelson et al.

(10) Patent No.: US 12,517,496 B2
(45) Date of Patent: Jan. 6, 2026

(54) VALVE DEGRADATION DETECTION VIA STROKE TIME ANALYSIS

(71) Applicant: Fisher Controls International LLC, Marshalltown, IA (US)

(72) Inventors: Phil Nelson, Union, IA (US); Clinton Schneider, Ankeny, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 647 days.

(21) Appl. No.: 17/903,568

(22) Filed: Sep. 6, 2022

(65) Prior Publication Data

US 2024/0077850 A1   Mar. 7, 2024

(51) Int. Cl.
| | |
|---|---|
| *G05B 19/416* | (2006.01) |
| *F15B 13/04* | (2006.01) |
| *F15B 19/00* | (2006.01) |
| *F15B 20/00* | (2006.01) |
| *F16K 31/12* | (2006.01) |

(Continued)

(52) U.S. Cl.
CPC ......... *G05B 19/416* (2013.01); *G05B 19/406* (2013.01); *F15B 2013/0409* (2013.01); *F15B 19/005* (2013.01); *F15B 20/008* (2013.01); *F15B 2211/634* (2013.01); *F16K 31/12* (2013.01); *F16K 37/0041* (2013.01); *F16K 37/0083* (2013.01); *G05B 19/4065* (2013.01); *Y10T 137/7761* (2015.04)

(58) Field of Classification Search
CPC ................ G05B 19/416; G05B 19/406; G05B 19/4065; G05B 19/413; F16K 37/0041; F16K 37/0083; F16K 31/12; Y10T 137/7761; F15B 19/005; F15B 2013/0409; F15B 2211/634; F15B 20/008
See application file for complete search history.

(56) References Cited

U.S. PATENT DOCUMENTS

| | | |
|---|---|---|
| 9,934,671 B1 | 4/2018 | Anderson |
| 10,619,760 B2 | 4/2020 | Anderson |

(Continued)

OTHER PUBLICATIONS

Kiesbauer et al. ("Modern control valves with failure diagnostics," 1999 European Control Conference (ECC), Karlsruhe, Germany, 1999, pp. 350-355, doi: 10.23919/ECC.1999.7099327.) (Year: 1999).*

(Continued)

*Primary Examiner* — Lisa M Caputo
*Assistant Examiner* — Christian T Bryant
(74) *Attorney, Agent, or Firm* — Quarles & Brady LLP

(57) ABSTRACT

A valve assembly monitoring system receives operational data that is representative of one or more parameters of a valve assembly's operation and that is collected by the valve assembly during normal operation. The valve assembly monitoring system is configured to identify, based on the operational data, a change in valve travel setpoint that indicates a start of a valve transition and a subsequent change in valve travel that indicates an end of the valve transition. Based on the identified start and end of the valve transition, the valve assembly monitoring system is configured to generate a valve transition time and to compare the generated transition time to transition time limits of the valve assembly to alert maintenance personnel to problematic increases in transition time.

18 Claims, 9 Drawing Sheets

(51) Int. Cl.
*F16K 37/00* (2006.01)
*G05B 19/406* (2006.01)
*G05B 19/4065* (2006.01)

(56) References Cited

U.S. PATENT DOCUMENTS

| | | |
|---|---|---|
| 10,877,465 B2 | 12/2020 | Nixon et al. |
| 2012/0139725 A1* | 6/2012 | Grumstrup .......... F16K 37/0091 |
| | | 702/183 |
| 2018/0112795 A1* | 4/2018 | Anderson ............ G05B 23/024 |
| 2018/0113446 A1* | 4/2018 | Anderson .......... G05B 23/0208 |
| 2018/0231144 A1* | 8/2018 | Anderson .......... F16K 37/0083 |
| 2021/0222794 A1* | 7/2021 | Fuller ................. F16K 37/0041 |

OTHER PUBLICATIONS

Instruction Manual, DVC6200 Digital Valve Controller, www.Fisher.com, Apr. 2022.
FieldVUE Instruments, A Planning Guide for Effective Use HART® Implementations, www.Fisher.com, Feb. 2020.

* cited by examiner

| DATA SET | TIME STAMP (HH:MM:SS) | TRAVEL SET POINT (%) | TRAVEL (%) | DEVIATION (%) | TRANSITION TIME (%) | TRANSITION DIRECTION | ABNORMAL | CRITICAL |
|---|---|---|---|---|---|---|---|---|
| 602 | 07:12:02.0 | 0.06 | 0.04 | 0.02 | | | | |
| 604 | 07:12:02.1 | 0.06 | 0.04 | 0.02 | | | | |
| 606 | 07:12:02.2 | 0.05 | 0.04 | 0.01 | | | | |
| 608 | 07:12:02.3 | 0.07 | 0.05 | 0.02 | | | | |
| 610 | 07:12:02.4 | 0.06 | 0.04 | 0.02 | | | | |
| ... | ... | ... | ... | ... | | | | |
| 612 | 07:12:04.0 | 0.04 | 0.04 | 0.00 | | | | |
| 614 | 07:12:04.1 | 0.04 | 0.04 | 0.00 | | | | |
| 616 | 07:12:04.2 | 0.04 | 0.03 | 0.01 | 1.9 | O | Y | N |
| 618 | 07:12:04.3 | 99.22 | 0.05 | 99.17 | | | | |
| 620 | 07:12:04.4 | 99.98 | 0.63 | 99.35 | | | | |
| ... | ... | ... | ... | ... | | | | |
| 622 | 07:12:05.2 | 99.99 | 38.23 | 61.76 | | | | |
| 624 | 07:12:05.3 | 99.99 | 44.74 | 55.25 | | | | |
| 626 | 07:12:05.4 | 99.99 | 51.93 | 48.06 | | | | |
| 628 | 07:12:05.5 | 99.98 | 60.08 | 39.90 | | | | |
| 630 | 07:12:05.6 | 100.00 | 66.47 | 33.53 | | | | |
| ... | ... | ... | ... | ... | | | | |
| 632 | 07:12:06.0 | 100.00 | 96.21 | 3.79 | | | | |
| 634 | 07:12:06.1 | 99.98 | 99.63 | 0.35 | | | | |
| 636 | 07:12:06.2 | 100.00 | 99.81 | 0.19 | | | | |
| 638 | 07:12:06.3 | 100.00 | 99.93 | 0.07 | | | | |
| 640 | 07:12:06.4 | 100.00 | 99.96 | 0.04 | | | | |

FIG. 6

VALVE DEGRADATION DETECTION VIA STROKE TIME ANALYSIS

FIELD OF THE INVENTION

This disclosure relates generally to the analysis of control valve operational data, and, more specifically, to the detection of valve degradation through the analysis of online valve operational data.

BACKGROUND

FIG. 1 illustrates a typical control valve assembly 5 that includes a control valve 8, a pneumatic actuator 12, and a digital valve controller 10. The control valve 8 is installed within a conduit (e.g., a pipe) and includes a control member that is adjusted (e.g., up and down in the case of the sliding stem valve depicted in FIG. 1) to adjust the flow of fluid through the valve 8. The pneumatic actuator 12 is coupled to the stem of the valve 8 and is configured to convert a pneumatic pressure driving force into a motion (e.g., a linear motion in the case of the sliding stem valve depicted in FIG. 1) that is imparted to the valve 8's stem to modulate the position of the valve 8's control member between open and closed positions. The digital valve controller (DVC) 10 receives a signal that is indicative of a desired valve position (e.g., 0% to 100% open) that is generally communicated to the DVC 10 as a hardwired analog signal, such as a 4-20 mA signal that is transmitted via a pair of wires that are connected to terminals within the DVC 10's terminal box 30. The DVC 10 implements a feedback control loop to adjust the pneumatic output that it delivers to the actuator 12 until the valve position (which is measured directly by the digital valve controller 10) matches the desired valve position. The present disclosure is related to the analysis of operational data that is collected by the DVC 10 to determine information about the performance of the valve 8.

SUMMARY

A valve assembly monitoring system that includes a monitoring control system including an input interface, an electronic processor, and one or more memories storing instructions executable by the electronic processor is disclosed. The monitoring control system is configured to: receive operational data, via the input interface, that is representative of one or more parameters of a valve assembly's operation and that is collected by the valve assembly during normal operation; identify, based on the operational data, a change in valve travel setpoint that indicates a start of an evaluable valve transition; identify, based on the operational data, a change in valve travel that indicates an end of the evaluable valve transition; and generate a valve transition time based on the start of the evaluable valve transition indicated by the change in valve travel setpoint and the end of the evaluable valve transition indicated by the change in valve travel.

The valve assembly monitoring system may include a valve assembly that includes: a valve; a position sensor configured to sense a position of the valve; a valve driver configured to control the position of the valve; a communication interface; and a valve controller that is configured to collect the operational data and to communicate the operational data to the monitoring control system via the communication interface.

The valve assembly monitoring system may be configured to generate an anomaly indication based on the valve transition time exceeding an anomaly threshold, the anomaly indication indicating an anomaly for the valve assembly. The valve assembly monitoring system may be configured to identify the change in valve travel setpoint that indicates the start of the evaluable valve transition by comparing a value of the valve travel setpoint at a first time to a value of the valve travel setpoint at a second time to determine whether a difference between the values of the valve travel setpoint at the first and second times exceeds a threshold. The valve assembly monitoring system may be configured to identify the change in valve travel that indicates the end of the evaluable valve transition by identifying a time after the start of the evaluable valve transition at which a difference between a value of the valve travel setpoint and the valve travel is less than a threshold. The valve assembly monitoring system may be additionally configured to: calculate a travel time between the start and the end of the evaluable valve transition; determine that the evaluable valve transition represents a transition in position that is less than a full transition of the valve assembly between fully opened and fully closed positions; and extrapolate a full transition time for the full transition of the valve assembly based on the travel time, wherein the valve transition time generated by the monitoring control system is the full transition time.

A method of monitoring a valve assembly includes: receiving, by an input interface of a monitoring control system including an electronic processor, operational data that is representative of one or more parameters of a valve assembly's operation and that is collected by the valve assembly during normal operation; identifying, by the monitoring control system, a change in valve travel setpoint that indicates a start of an evaluable valve transition based on the operational data; identifying, by the monitoring control system, a change in valve travel that indicates an end of the evaluable valve transition based on the operational data; and generating, by the monitoring control system, a valve transition time based on the start of the evaluable valve transition indicated by the change in valve travel setpoint and the end of the evaluable valve transition indicated by the change in valve travel.

The method may additionally include providing position data, by a position sensor, indicating a position of a valve of the valve assembly to a valve controller of the valve assembly; collecting, by the valve controller, the operational data based in part on the position data; and communicating, by the valve controller, the operational data to the monitoring control system.

The method may additionally include generating, by the monitoring control system, an anomaly indication based on the valve transition time exceeding an anomaly threshold, the anomaly indication indicating an anomaly for the valve assembly. In the method, identifying the change in valve travel setpoint that indicates the start of the evaluable valve transition may include comparing a value of the valve travel setpoint at a first time to a value of the valve travel setpoint at a second time to determine whether a difference between the values of the valve travel setpoint at the first and second times exceeds a threshold. In the method, identifying the change in valve travel that indicates the end of the evaluable valve transition may include identifying a time after the start of the evaluable valve transition at which a difference between a value of the valve travel setpoint and the valve travel is less than a threshold. The method may additionally include: calculating a travel time between the start and the end of the evaluable valve transition; determining that the evaluable valve transition represents a transition in position that is less than a full transition of the valve assembly between fully open and fully closed positions; and extrapolating a full transition time for the full transition of the valve assembly based on the travel time, wherein the valve transition time generated by the monitoring control system is the full transition time.

A non-transitory computer-readable medium storing computer-executable code is disclosed. The computer-executable code may be configured to cause a computer to: receive operational data that is representative of one or more parameters of a valve assembly's operation and that is collected by the valve assembly during normal operation; identify, based on the operational data, a change in valve travel setpoint that indicates a start of an evaluable valve transition; identify, based on the operational data, a change in valve travel that indicates an end of the evaluable valve transition; and generate a valve transition time based on the start and the end of the evaluable valve transition. The computer-executable code for causing the computer to identify the change in valve travel setpoint that indicates the start of the evaluable valve transition may include computer-executable code for causing the computer to compare a value of the valve travel setpoint at a first time to a value of the valve travel setpoint at a second time to determine whether the difference between the values of the valve travel setpoint at the first and second times exceeds a threshold. The computer-executable code may further include code for causing the computer to validate the identification of the start of the evaluable valve transition by determining whether a difference between a value of the valve travel setpoint and a value of the valve travel at a third time that is after the first time exceeds a threshold. The computer-executable code for causing the computer to identify the change in valve travel that indicates the end of the evaluable valve transition may include computer-executable code for causing the computer to evaluate, in time sequence, the operational data for times after the time that corresponds to the identified start of the evaluable valve transition to identify a first time after the start of the evaluable valve transition at which a difference between a value of the valve travel setpoint and the valve travel is less than a threshold.

The computer-executable code for causing the computer to generate a valve transition time based on the start and the end of the evaluable valve transition may include computer-executable code for causing the computer to calculate a difference between a first timestamp for a first data set that corresponds to the start of the evaluable valve transition and a second timestamp for a second data set that corresponds to the end of the evaluable valve transition. The computer-executable code may further include code for causing the computer to determine that the evaluable valve transition represents a transition in position that is less than a full transition of the valve assembly between open and closed positions and to calculate a full transition time for the valve assembly based on the calculated travel time. The computer-executable code may further include code for causing the computer to compare the travel time to one or more travel time limits for the valve assembly. The one or more travel time limits for the valve assembly may be based on one or more baseline travel times for the valve assembly.

BRIEF DESCRIPTION OF THE DRAWINGS

FIG. 6 is a table that shows certain values of the operational data that is shown in the graph in FIG. 5 in accordance with an aspect of this disclosure.

DETAILED DESCRIPTION OF THE INVENTION

Valve assemblies can experience degradation in structures, functions, or both over time. The degradation may be caused, for example, by normal wear from general use, by extreme or harsh environments, by operation outside of normal or expected use, or a combination thereof. In some examples, the degradation may take the form of slower response times for opening or closing the valve of the valve assembly (for example, valve 8 of valve assembly 5). Detecting such degradation and changes in response times may be difficult for one or more reasons. For example, because different valve assemblies exhibit different normal response times and because the amount of a change in a response time that may indicate an issue may be relatively small, it is very difficult or impossible for a human operator simply observing a valve assembly in operation to identify a change in response time that indicates degradation. Moreover, an operator or company may have many valve assemblies 5 in operation that may be spread out in disparate or remote locations, increasing the complexity of monitoring the valve assemblies. Further, existing valve assembly monitoring techniques generally only collect data regarding a valve assembly's operation at infrequent intervals (e.g., every hour, every four hours, etc.) that are substantially longer than a valve transition time, which makes it impossible to detect transition times. Moreover, even when data of sufficient temporal frequency to detect a valve assembly transition is available, it has been difficult to identify within such data the beginning and end of a valve transition and the elapsed time therebetween.

Embodiments described herein address one or more of these and other challenges to provide systems and methods for monitoring and detecting degradation in one or more valve assemblies using operational data from the valve assemblies.

Figure 2:
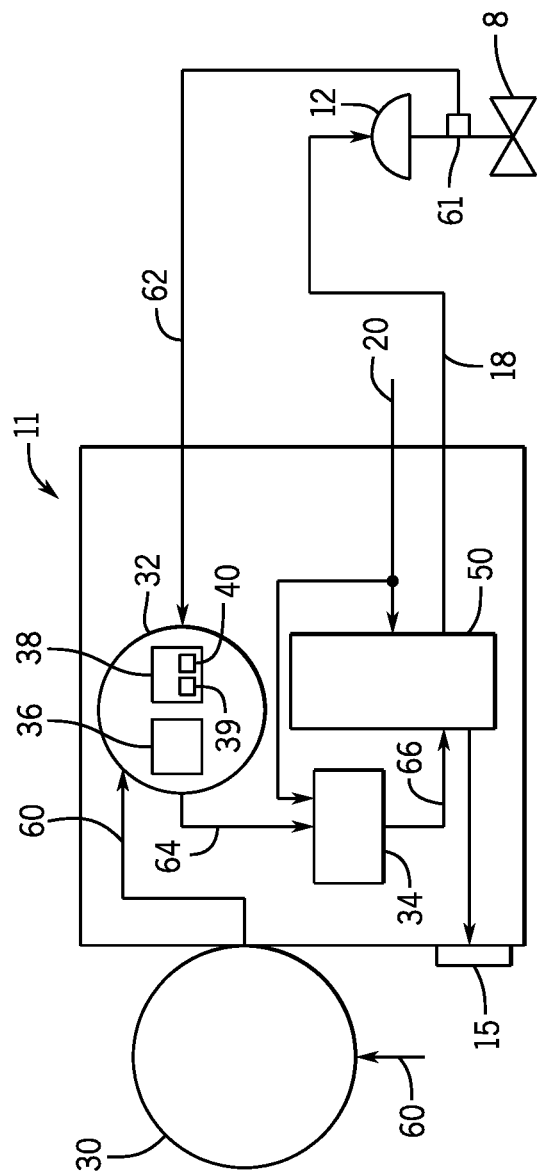
FIG. 2 is a schematic diagram that illustrates various components of a valve assembly in accordance with an aspect of this disclosure.

FIG. 2 illustrates a schematic of the internal components of a digital valve controller (DVC) 10 that may be configured according to the teachings of this disclosure. As described above, DVC 10 includes a terminal box 30 that houses electrical terminals to which signal wires are connected. The terminal box 30 is an example of a communication interface of the DVC 10 (and overall valve assembly 5). The signal wires include those carrying a travel setpoint signal 60 representative of the desired valve position. A printed circuit board (PCB) 32 receives both the travel setpoint signal 60 as well as a signal 62 representative of the actual valve travel (i.e., position, which is measured directly by DVC 10 instrumentation (a position sensor 61)). The PCB 32 may also be referred to as a valve controller. The position sensor 61 is, for example, a linear transducer or rotary encoder configured to sense and indicate the position of the valve 12. The PCB 32 includes a microcontroller 36, memory 38, and associated circuitry (collectively, "control circuitry") for executing the functionality of the DVC 10. In particular, the PCB 32 control circuitry executes a control algorithm to adjust a drive signal 64 that is output to the DVC 10's current-to-pneumatic (I/P) transducer 34. The I/P transducer 34 receives a pneumatic supply 20 (e.g., a 60-90 pounds per square inch gauge (psig) instrument air supply), which it regulates to the pneumatic drive signal 66 that it outputs based on the electric drive signal 64, typically as a simple linear translation (e.g., a 4-20 mA electric drive signal is converted to a 3-15 psig pneumatic drive signal). The pneumatic drive signal 66 is coupled to the input of a pneumatic relay 50, which regulates the pneumatic supply pressure 20 to a control pressure 18 that it passes to the DVC 10's output to actuator 12 in accordance with the pneumatic drive signal 66. When the control pressure 18 in the actuator 12 is higher than desired, the pneumatic relay 50 reduces the control pressure 18 by venting the pneumatic fluid via the vent port 15. The I/P transducer 34 and pneumatic relay 50 may be referred to as a valve driver, which, as described, is configured to control a position of the valve 8 (e.g., to fully opened, fully closed, and positions therebetween). The control algorithm is continuously executed by the microcontroller 36 to minimize the difference between the travel setpoint signal 60 and the valve position signal 62.

Figure 1:
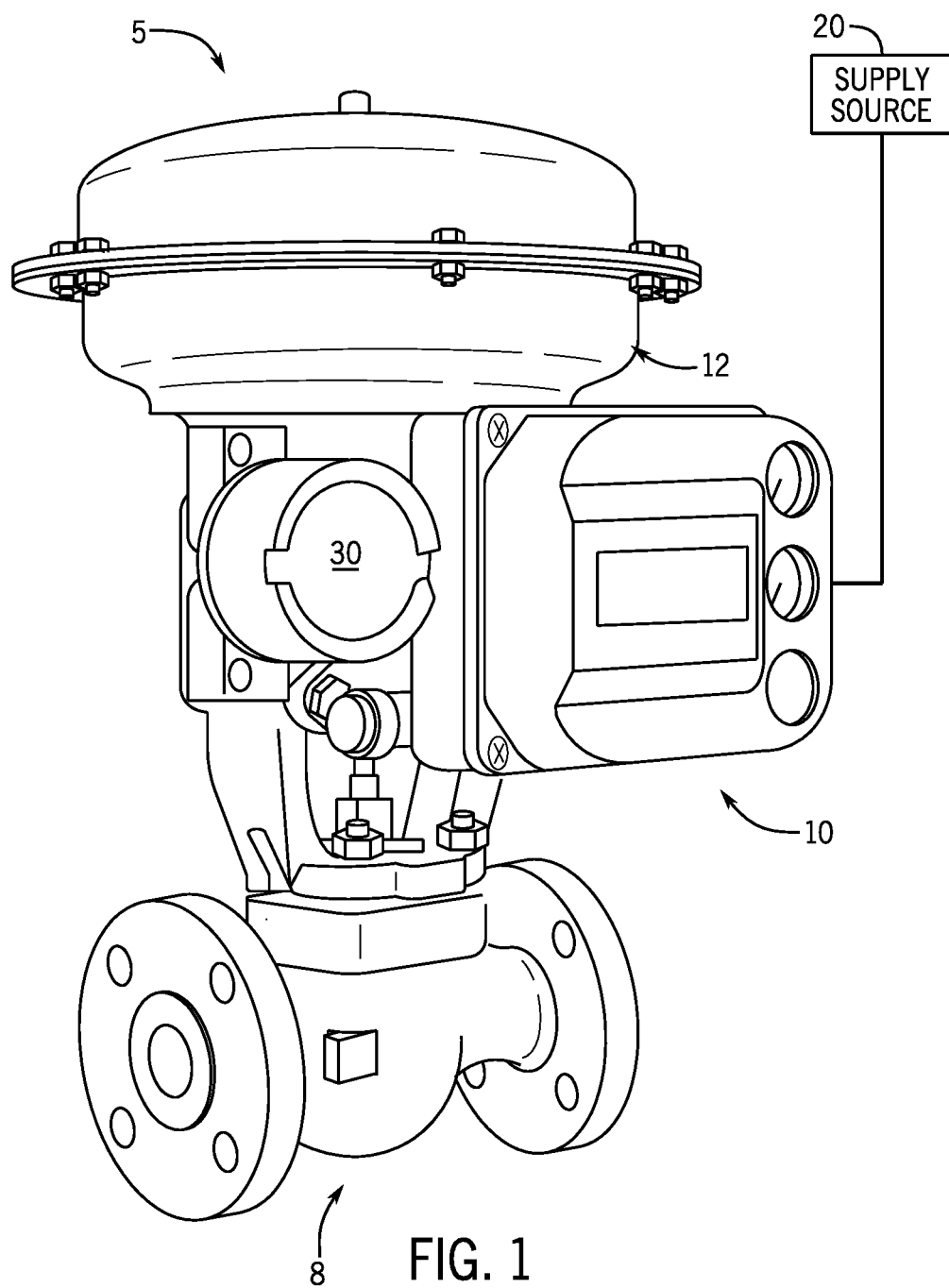
FIG. 1 is a perspective view of a control valve assembly that includes a control valve, a pneumatic actuator, and a digital valve controller.
Figure 3:
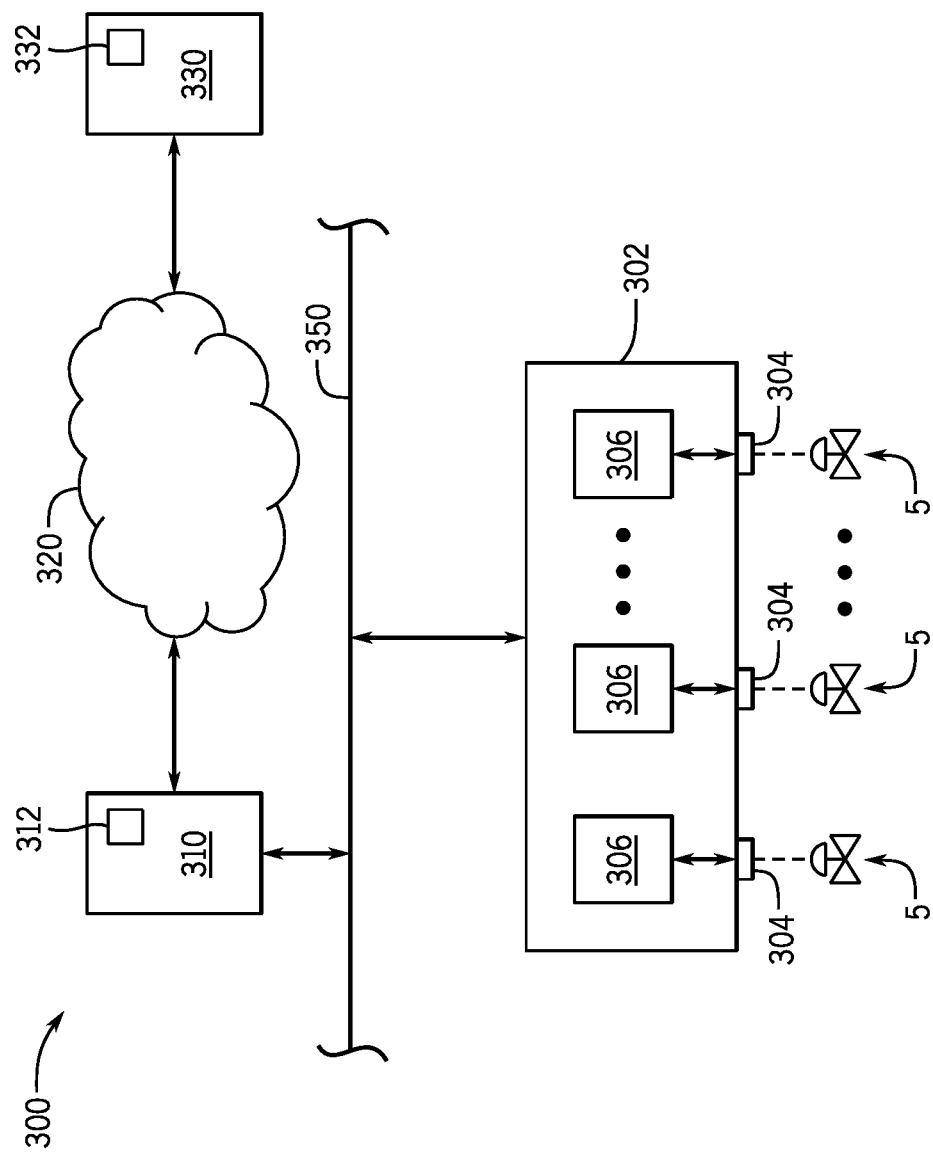
FIG. 3 is a block diagram of an environment that illustrated multiple valve assemblies in communication with a computing environment in accordance with an aspect of this disclosure.

FIG. 3 is a block diagram of an environment 300 within which aspects of the present disclosure may be implemented. The environment 300 may also be referred to as a valve assembly monitoring system 300. In the depicted environment 300, multiple control valve assemblies 5 are coupled to a control system 302. Specifically, in the illustrated embodiment, each control valve assembly 5 is connected to an input/output (I/O) interface 304 (e.g., an analog output module) of the control system 302. In a typical arrangement, the connection between a control valve assembly 5 and its corresponding I/O interface 304 may be via a pair of wires that are connected at a first end to electrical terminals of the I/O interface 304 and at a second end to electrical terminals in the terminal box 30 of the control valve assembly 5's DVC 10. While a hardwired interface between the control system 302 and each control valve assembly 5 is illustrated, it will be understood that other interfaces, including wireless interfaces or wired network communication interfaces (e.g., other than a typical analog control loop), may also be employed to communicatively couple the control system 302 to each control valve assembly 5. In other words, although the DVC 10 may include a terminal box 30 with a hardwired communication interface as illustrated in FIGS. 1-3, in other examples, the DVC 10 includes a communication interface for wireless communication (e.g., with the control system 302 or other component sending or retrieving data to the DVC 10).

Within the control system 302, control blocks 306 are configured to control the operation of the respective control valve assemblies 5. A typical control block 306 associated with a control valve assembly 5, for example, may execute proportional-integral-derivative (PID) control functionality to continuously adjust the travel setpoint signal 60 to the control valve assembly 5, and thus the amount of fluid that is permitted to flow through the valve 8, to maintain the value of a measured process variable (e.g., temperature, pressure, flow rate, etc.) at a desired setpoint. Such PID control functionality typically includes functionality to operate the control valve assembly according to the automatic PID control or via manual control in which the travel setpoint signal 60 to a control valve assembly 5 is set to a particular value (e.g., either by a human operator or by other control logic) rather than continuously adjusted based on the process variable. For example, a particular control valve assembly 5 may be normally controlled in an automatic PID control mode but automatically adjusted to a manual mode with a specified travel setpoint signal 60 (e.g., 0% to close the valve 8) upon a particular occurrence (e.g., a shutdown). In still other arrangements, a control valve assembly 5 may be operated in an on/off control arrangement in which the control block 306 executes logic that toggles the travel setpoint signal 60 to a control valve assembly 5 to move the valve 8 between open and closed positions to control a process (e.g., a pressure swing adsorption process, resin bed regeneration process, etc.).

In addition to executing control functionality to adjust the pneumatic output 18 to the actuator 12 to maintain the valve 8's position at the desired value, each DVC 10 may be configured to measure, store, and communicate operational data 70 such as valve position 62, valve position setpoint 60, pneumatic supply pressure 20, pneumatic output pressure 18, and drive signal 64 (see, e.g., FIG. 6). As used herein, operational data 70 refers to data that represents various operational aspects about a valve assembly 5 during the normal operation of the valve assembly 5 and does not include data that is collected about a valve assembly 5 outside of its normal operation, such as data about the operational aspects of a valve assembly 5 during a partial stroke test or other evaluation that is initiated to check the valve assembly 5's functionality. Such operational data 70 can provide valuable information regarding the changing performance of a control valve assembly 5 over time to facilitate decisions regarding necessary maintenance. Operational data 70 may be measured and stored in the DVC 10's memory 38 on a regular and periodic basis (e.g., every hour) by the DVC 10. In addition, a DVC 10 may be configured to measure and store operational data at a much higher frequency (e.g., every 100 milliseconds) upon the occurrence of a trigger event, such as a specified deviation between the DVC 10's travel setpoint 60 and travel 62 for a certain period of time (e.g., a deviation of 50% or more for 200 milliseconds) or the travel setpoint 60 approaching a high or low limit (e.g., position setpoint greater than 99% or less than 1%). When so configured, a DVC 10 may begin to measure and store operational data 70 at a higher frequency for a pre-configured time (e.g., 30 seconds) upon the occurrence of the trigger event. In one embodiment, a DVC 10 may be configured to continuously measure operational data 70 at a high frequency and save such high frequency data within a buffer 39 in the memory 38 (e.g., a buffer with a capacity to hold 10 seconds worth of high frequency operational data 70) but may only move operational data 70 to long-term memory 40 when the data 70 represents a regular periodic data point (e.g., data representing a regular, hourly measure of the DVC 10's operation) or when the trigger event has occurred. In such an embodiment, high frequency operational data 70 for a specified period before and after the occurrence of the trigger event (e.g., five seconds before the trigger event to 25 seconds after the trigger event) may be moved to long-term memory 40.

In the illustrated embodiment, both the control system 302 and an asset management system 310 are communicatively coupled to a process control network 350. An application 312 is executed by the asset management station 310 (e.g., by a processor of the asset management station 310) to cause the control system 302 to request the stored operational data 70 from the DVCs 10 of certain control valve assemblies 5 according to a schedule (e.g., daily, weekly, monthly, etc.). In a typical arrangement in which a control valve assembly 5 is connected to an I/O interface 304 via a pair of wires, the operational data 70 that is stored in the DVC 10's memory 38 may be communicated via the same pair of wires using a digital-over-analog protocol such as the HART protocol, which, as is known, permits simultaneous transmission of the analog control signal (i.e., position setpoint 60) and digital data such as operational data 70. In such an embodiment, the application 312 causes the asset management system 310 to issue a request for operational data 70 from one or more control valve assemblies 5 to the control system 302, which, in turn, issues a request to each of the one or more DVCs 10 for the designated control valve assemblies 5 via the digital-over-analog protocol. The DVCs 10 then respond with the requested operational data 70, which may include all operational data 70 in its long-term memory 40, all operational data 70 in its long-term memory 40 since the last request for such data, or some other block of operational data 70 based on the request and/or the configuration of the DVC 10. The operational data 70 may be organized in data sets that include a value that is representative of each operational parameter that was measured, such as valve position 62, valve position setpoint 60, pneumatic supply pressure 20, pneumatic output pressure 18, and drive signal 64. Each data set may additionally include a value that identifies the DVC 10 (a DVC identifier) and a timestamp value 67 that indicates the time at which the values in the data set were measured.

While a typical embodiment may employ communications via a digital-over-analog interface between the control system 302 and the DVC 10, other arrangements may utilize different types of interfaces for communicating the travel setpoint 60 and the operational data 70. For example, the control system 302 and DVC 10 may use a wireless interface (e.g., Bluetooth or Wi-Fi), or another wired interface (e.g., USB or Ethernet) for communicating with one another. Similarly, the asset management system 310 may independently and directly (i.e., without communicating via the control system 302) request operational data 70 from the DVCs 10 of various control valve assemblies 5 if the asset management system 310 and DVCs 10 are configured for direct communication.

In the illustrated environment 300, the asset management system 310 is communicatively coupled (typically through multiple network security devices that are omitted for purposes of clarity) to the internet 320, which enables communication between the asset management system 310 and an internet-connected remote monitoring system 330. The remote monitoring system 330 executes a monitoring application 332 to retrieve operational data 70 from the asset management system 310 (e.g., according to a configured schedule) and perform analytics on the operational data 70 to identify control valve assemblies 5 that may require attention, maintenance, and/or replacement.

Figure 4:
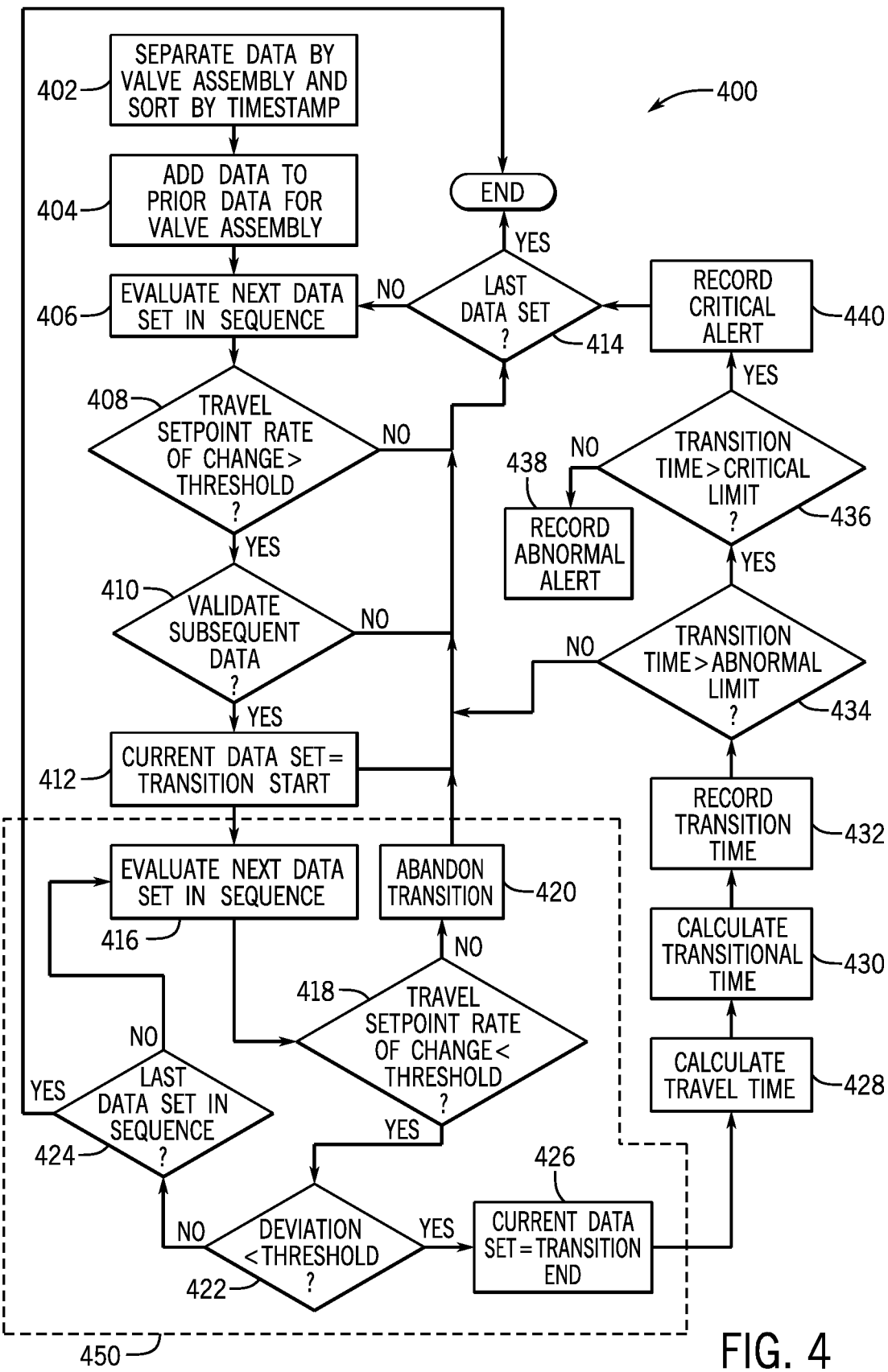
FIG. 4 is a flowchart that illustrates a process for calculating a transition time for a control valve assembly in accordance with an aspect of this disclosure.
Figure 8:
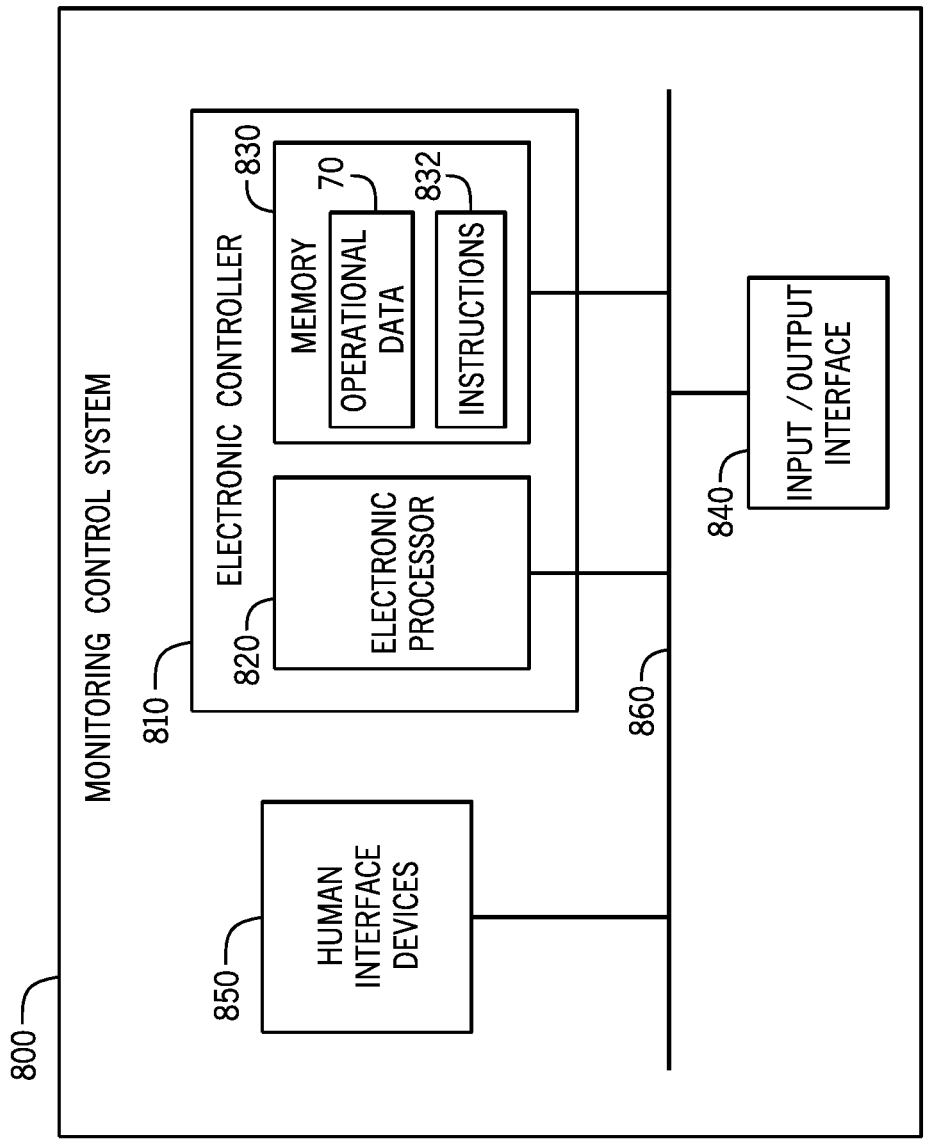
FIG. 8 is a block diagram of a monitoring control system in accordance with an aspect of this disclosure.

FIG. 4 is a flow chart that illustrates a process 400 that is executed by the monitoring application 332 for identifying open and close times of valve assemblies 5 based on operational data 70. For example, an electronic controller of the internet-connected remote monitoring system 330, which may include a memory storing the monitoring application 332 and an electronic processor that executes the monitoring application 332, may perform the process 400 through this execution of the monitoring application 332. An example of such an electronic controller is illustrated in FIG. 8 (electronic controller 810) and described further below. Additionally, although the steps of the flowchart 400 are illustrated in a particular order, in some embodiments, one or more of the steps can be executed partially or entirely in parallel, can be executed in a different order than illustrated in FIG. 4, or can be bypassed.

Initially, the process 400 separates the operational data 70, which may represent data about the operation of numerous valve assemblies 5 at numerous different times, by valve assembly 5 and sorts operational data 70 for each valve assembly 5 sequentially according to the data sets' timestamps 67 (step 402). The sequentially arranged data sets for each valve assembly 5 are then added to prior data sets for the valve assembly 5 (step 404). For each valve assembly 5, then, the next data set in the sequence (i.e., the next data set that has not been previously processed as part of the process 400) is evaluated (step 406). Specifically, the rate of change of the travel setpoint 60 for the data set is compared to a threshold (step 408). The travel setpoint 60's rate of change may be evaluated by comparing the value of the travel setpoint 60 for the current data set to the value of the travel setpoint 60 for a prior or subsequent data set. In one embodiment, the process 400 is configured to identify and quantify transition times for full open-to-close or close-to-open transitions. In such an embodiment, step 408 may be configured to determine whether the travel setpoint 60 for the current data set is a command to fully open or close the valve 8 (e.g., a travel setpoint of >99% or less than 1%). If so, the value of the travel setpoint 60 from a transition data set that is a fixed number of data sets away from the current data set (e.g., two data sets subsequent to the current data set, two data sets prior to the current data set, etc.) is evaluated to determine whether the travel setpoint 60 in the transition data set represents a command to fully open or close the valve 8 that is opposite of the command to fully open or close the valve 8 in the current data set (i.e., a transition from open to close or close to open between the current data set and the transition data set).

In another embodiment, step 408 may evaluate for a large and sudden change in travel setpoint 60 without requiring a full open-to-close or close-to-open transition. The threshold rate of change may be selected such that only substantial changes in travel setpoint 60 that would permit a practical evaluation of valve travel time are evaluated. In such an embodiment, the change in travel setpoint 60 between the current data set and transition data set (which, once again, may be a data set that is one or more data sets prior to or after the current data set in the sequential arrangement) may be evaluated according to the difference in travel setpoint 60 between the current and transition data sets (e.g., a change of 60% in the travel setpoint 60 between the current and transition data sets). As will be described below, a substantial change in travel setpoint 60, even if not corresponding to a full transition between the open and closed valve positions, may permit an evaluation of travel time that can be extrapolated to infer the full travel time between the open and closed valve positions.

If it is determined that the rate of change of the travel setpoint 60 between the current data set and the transition data set is greater than the defined threshold value (the "Yes" prong of step 408), the transition is validated by evaluating a validation data set that is subsequent to the current data set (step 410). The validation data set may be the same or a different data set than the transition data set. The validation process may include verifying that the valve travel deviation 63 (typically calculated as the difference between valve travel 62 and valve travel setpoint 60 and not necessarily natively recorded by the DVC 10) is greater than a defined threshold. The validation step 410 ensures that the change in travel setpoint 60 identified in step 408 was not merely the result of bad data and further ensures that the valve has not moved so quickly toward the transition data set travel setpoint as to make a measurement of the travel time impractical. In one embodiment, the validation data set may validate the identification of the current data set as the beginning of a transition if the valve travel deviation is greater than 80% of the change in travel setpoint 60 between the current data set and the transition data set. In other embodiments, other validation threshold values may be selected to ensure that the valve assembly 5 has actually been commanded to significantly change its position and that the operational data 70 will permit calculation of the travel time corresponding to the transition. If the evaluation of the current data set indicates a change in travel setpoint 60 greater than the defined threshold (the "Yes" prong of step 408) and that transition is validated through the evaluation of a subsequent validation data set (the "Yes" prong of step 410), the current data set is identified as the start of a transition (step 412). If the current data set does not indicate a change in travel setpoint 60 greater than the transition threshold (the "No" prong of step 408) or the transition is not validated through the evaluation of a subsequent validation data set (the "No" prong of step 410), the process 400 determines whether the current data set is the last data set in the sequence for the particular valve assembly 5 (step 414), and, if not (the "No" prong of step 414), proceeds to the subsequent data set (step 406) to repeat the analysis for that data set.

Figure 5:
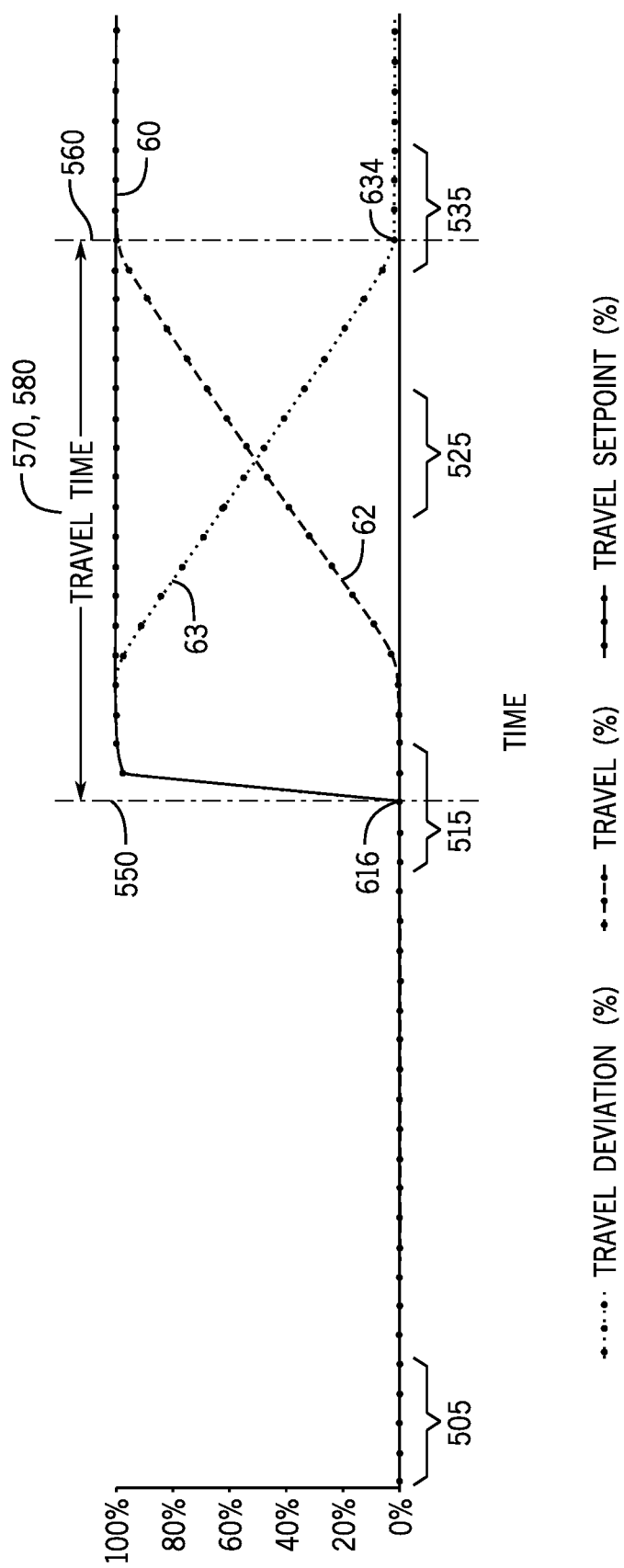
FIG. 5 is a graph that shows various operational data for a control valve assembly over a period of time in accordance with an aspect of this disclosure.

FIG. 5 is a graphical indication of sequentially arranged data sets of operational data 70, in which each data set includes a value representative of valve travel 62, valve travel setpoint 60, valve travel deviation 63 (which may be calculated rather than recorded directly by the DVC 10 as noted above), timestamp 67, and valve assembly 5 identifier (all operational data 70 corresponds to the same valve assembly 5 and thus includes the same identifier in each data set for the operational data 70 shown in FIG. 5). The values of the various operational data 70 that are shown in graphical form are more specifically identified for various examples of consecutive data sets in the table shown in FIG. 6. Portion 505 illustrates a time period during which valve assembly 5 is commanded to and is in the closed position. Portion 515 represents a time period during which the valve assembly 5 transitions from being commanded to the closed position to being commanded to the open position but before the valve assembly 5 has begun to significantly move away from the closed position toward the open position. Portion 525 represents a time period during which the valve assembly 5 is commanded to the open position and the valve is in transition from the closed position to the open position. Portion 535 represents a time period during which the valve assembly 5 is commanded to the open position and the valve 5 completes its transition to the open position.

When step 408 of process 400 is applied to data set 606 with a transition data set configuration of +1 (meaning the data set that is one set after the evaluation data set is used as the transition data set) and a transition threshold of 98% per tenth second, the travel setpoint 60 rate of change is equal to the difference between the travel setpoint 60 for data set 608 and the travel setpoint 60 for data set 606 divided by the elapsed time between data sets 606 and 608, the result of which is 0.02% per tenth second. Because the calculated travel setpoint 60 rate of change for data set 606 is far below the threshold of 98% per tenth second, data set 606 does not represent the beginning of an evaluable transition. By contrast, if step 408 of process 400 is applied to data set 616, the calculated travel setpoint 60 rate of change is 99.18% per tenth second, which is greater than the threshold of 98% per tenth second. As a result, the process 400 would proceed to step 410 to validate that data set 616 represents the start of a transition. Using a validation data set configuration of +2 (meaning the data set that is two sets after the evaluation data set is used as the validation data set) and a validation threshold of 80% of travel setpoint 60 change between the evaluation data set and the transition data set, data set 620 has a deviation of 99.35%, which is greater than the 80% threshold change in travel setpoint 60 between the evaluation data set 616 and the transition data set 618 (i.e., greater than 79.34%, which is the threshold 80% of the 99.18% change in travel setpoint 60 measured in step 408). Consequently, data set 616 is validated as the start of an evaluable transition and is set as the data set that corresponds to the start of the valve transition 550. Specifically, because the change in travel setpoint 60 is positive (i.e., travel setpoint 60 is increasing with increasing time), the evaluation data set 616 is set as the data set at which an open transition begins.

Returning to FIG. 4, having identified and validated a transition start point, the process 400 proceeds to step 416 to move to the next data set in the sequence (i.e., the data set following the transition start data set), making the next data set the new evaluation data set. The rate of change in travel setpoint 60 for the new evaluation data set is determined (step 418). Step 418 may be performed in the same manner as step 408 (i.e., by calculating the change in travel setpoint 60 between the evaluation data set and a transition data set that is a specified number of data sets prior to or subsequent to the evaluation data set). In the case of step 418, though, the rate of change in the travel setpoint 60 is compared to a setpoint stability threshold to verify that the travel setpoint 60 is stable. The purpose of step 418 is to ensure that the valve transition is being measured according to a stable travel setpoint 60. For example, if the travel setpoint 60 changes from 0% (closed) to 100% (open) but then immediately changes to 50% before the valve assembly 5 has fully transitioned to the open position (such as may occur if an operator incorrectly inputs a manual setpoint but quickly corrects the error), the calculation of the travel time will not be meaningful. In one embodiment, the stability threshold may be 5% per tenth second, although other thresholds that permit the travel setpoint 60 stability to be verified may also be used. If the rate of change in the travel setpoint 60 exceeds the stability setpoint (the "No" prong of step 418), the transition evaluation is abandoned (step 420) by removing the identifier of the transition start point from the data set that was identified at step 412 and the process 400 returns to step 414.

If the travel setpoint 60 for the evaluation data set is determined to be stable (the "Yes" prong of step 418), the deviation value for the evaluation data set is compared to a transition complete threshold (step 422). Step 422 identifies the data set that corresponds to the end of the transition that was initiated at the transition start data set—i.e., the point at which the valve travel 62 is sufficiently close to the travel setpoint 60 for the transition to be considered complete. In one embodiment, the transition complete threshold may be set to 1% though other values might also be used. If the deviation value for the evaluation data set is greater than the transition complete threshold (the "No" prong of step 422, which indicates that the valve 8 is still traveling toward the travel setpoint 60), the process 400 evaluates whether the evaluation data set is the final data set in the sequence for the valve assembly 5 (step 424), and, if not (the "No" prong of step 424), proceeds to the subsequent data set (step 416) and steps 418 and 422 are repeated. If the deviation value for the evaluation data set is less than the transition complete threshold (the "Yes" prong of step 422, which indicates that the valve 8 has completed the transition to the travel setpoint 60), the evaluation data set is identified as the transition end point (step 426).

The application of the transition end identification portion 450 of the process 400 can be illustrated with reference to FIG. 6. When step 418 is applied to data set 618 with a transition data set configuration of +1 and a stability threshold of 5% per tenth second, the travel setpoint rate of change is equal to 0.76% per tenth second. Because the calculated travel setpoint 60 rate of change for data set 618 is less than the stability threshold, the process 400 proceeds to step 422. Assuming a transition complete threshold of 1%, the 99.17% deviation value 63 for data set 618 exceeds the transition complete threshold, so the process 400 proceeds to step 416 to evaluate data set 620 (the "No" prong of step 422 followed by "No" prong of step 424). As can be seen from the graph in FIG. 5 and the corresponding data in FIG. 6, the process 400 continues moving sequentially through the data sets repeating steps 418 and 422. For example, at data set 626, the calculated travel setpoint 60 rate of change of 0.01% per tenth second is less than the example stability threshold of 5% per tenth second, so the process 400 proceeds to step 422. The deviation value 63 of 48.06% for data set 626 is greater than the example transition complete threshold of 1% so the process 400 proceeds to step 416 to evaluate data set 628 (the "No" prong of step 422 followed by the "No" prong of step 424).

The transition end identification portion 450 of the process 400 continues to sequentially evaluate the data sets as long as the travel setpoint 60 is stable (the "Yes" prong of step 418) and until a data set having a deviation value 63 that is less than the transition complete threshold. Referring again to FIGS. 5 and 6, data set 634 has a deviation value 63 of 0.35%, which is less than the example transition complete threshold of 1%. Accordingly, the transition end identification portion 450 of the process 400 proceeds to step 426 and identifies data set 634 as the end of the transition 560.

Returning to FIG. 4, following identification of the data set that represents the end of the transition, the travel time is calculated (step 428). The travel time is the time difference between the data sets that represent the start of the transition 550 and the end of the transition 560. In the example of FIGS. 5 and 6, data set 616 represents the start of the transition 550 and data set 634 represents the end of the transition 560. The difference between the data sets' respective time stamps is 1.9 seconds, which is the travel time 570. From the calculated travel time 570, the full transition time 580 (i.e., the full transition time between the valve from the open to closed position or the closed to open position) can be calculated (step 430). If the parameters of the process 400 are configured such that only transitions between the fully open and fully closed states are evaluated (e.g., the travel setpoint 60 rate of change threshold at step 408 is configured to only capture open-to-closed or closed-to-open transitions), the travel time 570 that is calculated in step 428 will be equal to the full transition time 580. However, if the parameters of the process 400 are configured such that transitions that are less than a full open-to-closed or closed-to-open transition are identified, the travel time 570 that is calculated at step 428 is extrapolated to determine the full transition time 580. In one embodiment, the extrapolation of the full transition time 580 is a simple linear extrapolation based on the amount of travel between the identified start of the transition 550 and end of the transition 560. For example, if the data set corresponding to the start of the transition 550 indicates a valve travel 62 of 21.8% and the data set corresponding to the end of the transition 560 indicates a valve travel 62 of 100.0% with a calculated travel time of 1.4 seconds, the full open transition time 580 may be calculated to be 1.79 seconds based on the 1.4 seconds required for 78.2% travel.

In a more sophisticated embodiment, the full transition time 580 may be calculated from a partial transition travel time 570 based on a stored valve signature that is representative of a baseline travel time and is unique to each particular valve assembly 5 and direction (i.e., each valve assembly 5 includes an opening signature and a closing signature that are unique to the valve assembly 5). Such a valve signature may be recorded and stored (such as by the valve assembly 5's DVC 10 and communicated to the application 332) upon the valve assembly 5's commissioning to establish the baseline operation of the valve assembly 5. In such an embodiment, step 430 may compare the travel range represented between the data sets corresponding to the start of the transition 550 and the end of the transition 560 (e.g., 21.8% at transition start to 100% at transition end) to the baseline travel duration for the same travel range in the valve's corresponding unique signature (i.e., the valve assembly 5's opening signature). If the calculated partial transition travel time 570, for example, is 1.4 seconds, and the baseline travel time across the partial transition travel range (e.g., 21.8% to 100%) is 1.2 seconds with a baseline full open transition travel time of 1.6 seconds, step 430 may calculate the full open transition time 580 based on the product of the baseline full open transition time and the ratio of calculated travel time 570 to baseline travel time across the calculated travel range (i.e., 1.6 seconds*1.4 seconds/1.2 seconds) to calculate a 1.87 second full opening transition travel time 480. Alternatively, step 430 may add the baseline travel time for that portion of the baseline full opening transition that does not overlap with the calculated travel range (e.g., 0% to 21.8% continuing the above example) to the calculated travel time to calculate a 1.8 second (i.e., 0.4 seconds baseline for 0% to 21.8% travel and 1.4 seconds calculated for 21.8% to 100% travel) full opening transition time 580.

The calculated full transition time 580 is recorded along with other data relating to the valve assembly 5 (step 432), such as within a database record for the data set corresponding to the start of the transition 550 or the data set corresponding to the end of the transition 560 (see transition time 580 recorded for data set 616 in FIG. 6). The transition direction 590 (i.e., opening or closing) is also recorded based on the direction of valve travel between the start of the transition 550 and the end of the transition 560. The calculated full transition time 580 can be compared to one or more travel time limits to identify valve assemblies that may be experiencing issues such as increased friction between internal components, decreased actuator effectiveness, and/or other issues that may require inspection and maintenance. In particular, the calculated full transition time 580 may be compared to an abnormal limit (step 434) and a critical limit (step 436). The abnormal and critical time limits may differ in different transition directions (for example, the abnormal and critical time limits may be greater for a closing transition than for an opening transition), and the calculated full transition travel time 480 may be compared to the limits that correspond to the transition direction (i.e., a full transition travel time 480 in the open direction is compared to the open abnormal and the open critical time limits while a full transition travel time 480 in the close direction is compared to the close abnormal and the close critical time limits). The abnormal time limits are configured at a value that is higher than the expected time for the full transition 480 such that a measured transition time 480 exceeding the abnormal time limits warrants attention. In one embodiment, the abnormal time limit may be the product of a fixed multiplier applied to the baseline travel time for the valve transition (e.g., 130% of baseline open travel time) and may therefore be unique to each valve assembly 5 and each transition direction. The abnormal time limit may represent a transition time that warrants attention but does not necessarily represent a critical maintenance issue. If the calculated full transition time 480 exceeds the abnormal limit for the transition direction (the "Yes" prong of step 434), the full transition travel time 480 is compared to the critical transition time limit (step 436). In one embodiment, the critical time limit may be the product of a fixed multiplier applied to either the baseline travel time for the valve transition or to the abnormal time limit (e.g., 200% of abnormal travel time limit). The critical time limit is greater than the abnormal time limit and may represent a transition time that warrants urgent attention by maintenance personnel as it represents a significant impact on the functionality of the valve assembly and may therefore impact process control. If the full transition time 480 exceeds the abnormal time limit for the transition direction (the "Yes" prong of step 434) but does not exceed the critical transition time limit (the "No" prong of step 436), the full transition time is identified as abnormal (step 438), such as by setting the value of an abnormal field 592 in the data set in which the full transition time is recorded. If the full transition time 480 exceeds the abnormal time limit for the transition direction (the "Yes" prong of step 434) and the critical transition time limit (the "Yes" prong of step 436), the full transition time 480 is identified as critical (step 440), such as by setting the value of a critical field 594 in the data set in which the full transition time 480 is recorded. For example, assuming the valve assembly 5 for which the operational data 70 of FIGS. 5 and 6 is collected has an open abnormal time limit of 1.5 seconds and an open critical time limit of 3.0 seconds, the calculated full transition time 480 of 1.9 seconds would result in the identification of the full transition time 480 as abnormal but not critical (e.g., data set 616 abnormal field 592 is marked as "Yes" and critical field 594 is marked as "No"). If the full transition time is less than the abnormal time limit for the transition direction (the "No" prong of step 434) or following identification of the full transition time as abnormal (step 438) or critical (step 440), the process 400 returns to step 414 and continues until the last data set in the sequence is processed (the "Yes" prong of step 424 or step 414). Process 400 may be repeated for each of the valve assemblies 5 that are configured within the application 332 for transition time analysis using the operational data 70 data sets received by the application 332 for the respective valve assemblies 5.

Figure 7:
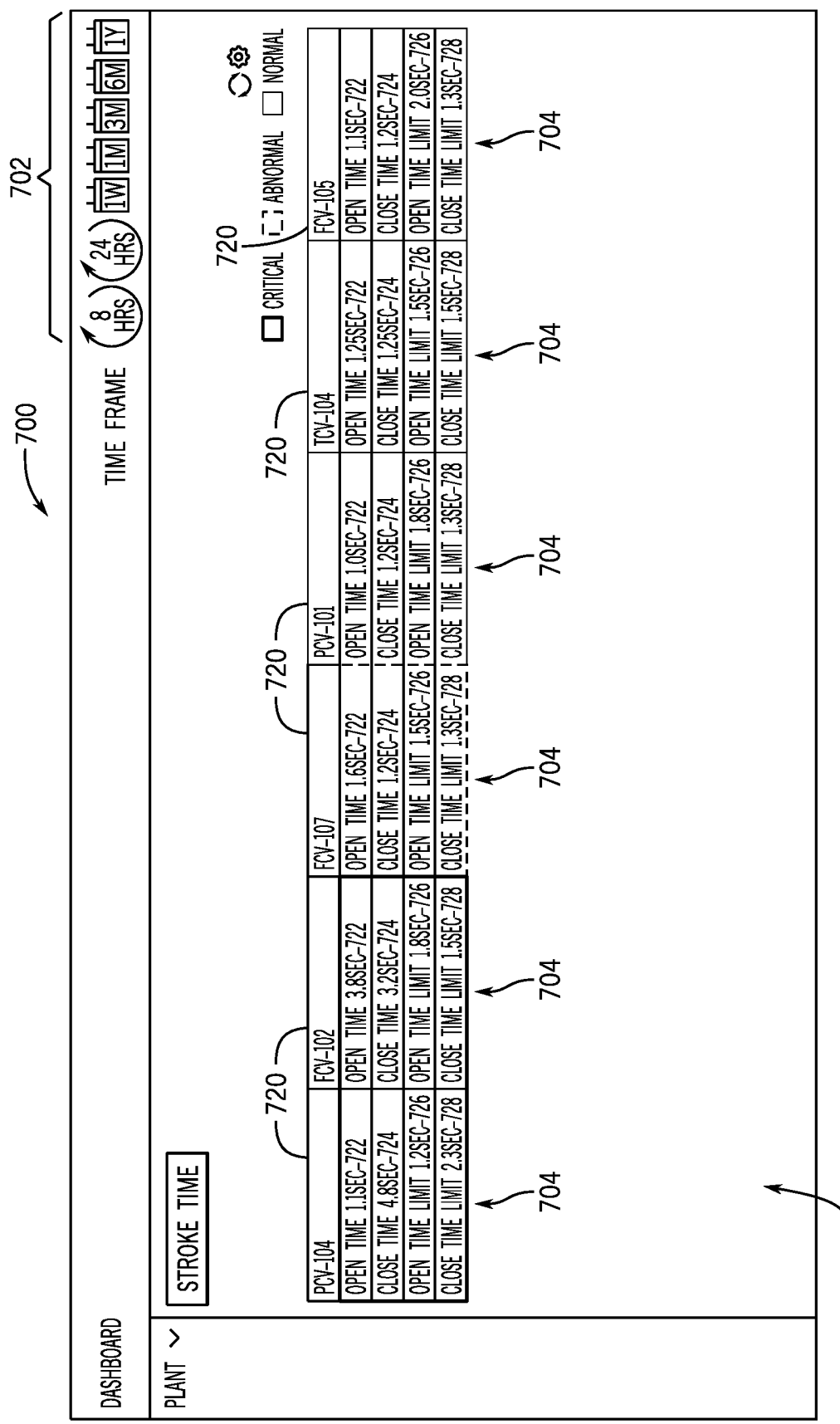
FIG. 7 is a user interface that illustrates various parameters of the operation of several valve assemblies in accordance with an aspect of this disclosure.

FIG. 7 illustrates an example graphical interface 700 that may be generated by the application 332 based on the results of the process 400. Because the remote monitoring system 330 is connected to the internet 320, the interface 700 may be presented as a webpage that is accessible from any internet connected device using the appropriate login credentials. In the top right corner of the interface 700, there are multiple selectable icons 702 that permit the user to select the time frame over which the data is displayed. In the illustrated embodiment, the user may filter the data to display the last eight hours, 24 hours, one week, one month, three months, six months, or one year, but different options, including a user-configurable date range, may also be included. Based on the selected time frame, each valve assembly 5 for which transition time data (such as the data in FIGS. 5 and 6) exists is represented by a valve indicator 704 in the main window 706. Each valve indicator 704 includes a valve assembly identifier 720 that uniquely identifies the valve assembly 5 with which the information in the indicator 704 is associated, a value for the transition time 722 in the open direction for the valve assembly 5, a value for the transition time 724 in the close direction for the valve assembly 5, the abnormal limit 726 for the open direction, and the abnormal limit 728 for the close direction. In the example embodiment, the critical limit is double the abnormal limit for each direction and for all valve assemblies 5, so it is not separately indicated in the valve indicator 704. However, in another embodiment, the critical limit may be separately indicated in each direction and for each valve assembly 5. As illustrated, each valve assembly 5 may include abnormal limits that differ from other valve assemblies 5 (e.g., larger valves may generally have longer transition times and thus longer abnormal limits) and that differ even for a particular valve assembly 5 based on the transition direction (e.g., a valve may move more quickly in its failure direction than in the opposite direction).

The illustrated transition times 722, 724 for each valve assembly 5 may represent the most recent transition time recorded for the valve assembly 5 in each direction. In another embodiment, the illustrated transition times 722, 724 for each valve assembly 5 may represent the maximum time recorded for the valve assembly 5 during the specified time period. The indicators 704 for each valve assembly 5 indicate whether the illustrated transition time 722, 724 in either direction is identified as abnormal or critical. For example, the border or background color for the indicator 704 may appear in a first color (e.g., gray) if the illustrated transition times 722, 724 for the valve assembly 5 are neither abnormal or critical, a second color (e.g., yellow) if either of the illustrated transition times 722, 724 for the valve assembly 5 are abnormal, and a third color (e.g., red) if either of the illustrated transition times 722, 724 for the valve assembly 5 are critical. The indicators 704 may additionally be organized within the window 706 based on the identification of the valve assembly 5's transition time as critical, abnormal, and normal. For example, in the illustrated embodiment, the valve indicators 704 are arranged within the window 706 based on the identification of the transition time status of the respective valve assemblies 5 with those identified as critical displayed first followed by those identified as abnormal and then those identified as normal. In this manner, changes in valve transition time can be evaluated (and identified if requiring attention) based on operational data 10 that is collected during the normal operation of the valve assembly 5 and without requiring any interruption to the operation of the valve assembly 5 (such as removing for inspection or performing a partial stroke test).

FIG. 8 illustrates a block diagram of a monitoring control system 800. With reference to FIG. 3, the monitoring control system 800 may be integrated into or serve as the internet-connected remote monitoring system 330, the asset management system 310, the control system 302, or one or more of the valve assemblies 5. For example, the monitoring control system 800 may be integrated into or serve as the control system 302 and, in addition to the functions of the system 800 discussed below, may also include the control blocks 306 and perform the functions of the control system 302 described above. In such examples, the monitoring control system 800 may directly communicate with the valve assemblies 5. As another example, the monitoring control system 800 may be integrated into the DVC 10 of one or more individual valve assemblies 5 to provide on-unit monitoring. In such cases, the functionality of the processor 820 and the memory 830 may be integrated into the processor 36 and the memory 38, respectively (see FIG. 3). Further, in some examples, the system 300 may incorporate multiple monitoring control systems 800 at various levels, such as in two or more of the valve assemblies 5, the control system 302, the asset management system 310, and the internet-connected remote monitoring system 330. Such redundancy can provide monitoring functions both locally at or near a valve assembly 5, as well as remotely at an off-site location.

In the example illustrated, the monitoring control system 800 includes an electronic controller 810 having an electronic processor 820 and a memory 830 storing instructions 832. The system 800 further includes an input/output (I/O) interface 840, and human interface devices 850. The electronic processor 820, the memory 830, the I/O interface 840, and the human interface devices 850 can communicate over one or more control buses, data buses, etc., which can include a device communication bus 860.

The memory 830 can include read-only memory (ROM), random access memory (RAM), other non-transitory computer-readable media, or a combination thereof. The memory 830 can include instructions 832 (e.g., the monitoring application 332 of FIG. 3) for the electronic processor 820 to execute, as well as the operational data 70 for one or more of the valve assemblies 5 received via input/output interface 840.

The electronic processor 820 is configured to communicate with the memory 830 to store data and retrieve stored data to and from the memory 830 (e.g., including the operational data). The electronic processor 820 is further configured to retrieve and execute the instructions 832 from the memory 830. For example, through execution of the instructions 832 by with the electronic processor 820, the electronic controller 810 may perform the functions of the monitoring control system 800 described herein and methods described herein (e.g., the flowchart 900 of FIG. 9).

The I/O interface 840 includes one or more input and output interface elements that enable the electronic controller 810 to communicate with other components of the valve assembly monitoring system 300 (see FIG. 3), including the valve assemblies 5 directly or indirectly via the asset management system 310 or the control system 302. The other components of the system 300 with which the controller 810 may communicate will depend on the component in which the monitoring control system 800 is integrated into or serving as. In some embodiments, the input/output interface 840 enables wireless and/or wired communication according to one or more known protocols (e.g., Wi-Fi, Bluetooth, USB, Ethernet, an Internet protocol, etc.). For example, the input/output interface 840 includes wired or wireless interface circuitry, such as antennas, wired ports, and transceivers for transmitting and receiving signals using antennas and/or wired ports. At least in some examples, the electronic controller 810 is configured to receive operational data from one or more valve assemblies 5 via the I/O interface 840, which may also be referred to as a communication interface.

The human interface devices 850 includes, for example, one or more of a display, touchscreen, touchscreen display, keyboard, mouse, pushbutton, dial, light emitting diode (LED) indicators, speaker, and the like. In some examples, the human interface devices 850 include remote devices not co-located with the electronic controller 810. For instance, in an example in which the electronic controller 810 is implemented as a server or part of a cloud computing system, the human interface device 850 may be a client workstation (e.g., laptop, smart phone, tablet, or desktop computer). For example, the client workstation may access a website that the electronic controller 810 hosts or populates with data. Whether locally or remotely located, the electronic controller 810 may receive user input from the human interface devices 850 (e.g., identifying one or more valve assemblies 5 to request monitoring information for such valve assemblies 5) and provide output to a user via the human interface devices 850 (e.g., determined transition times or anomalies for monitored valve assemblies 5). For example, the electronic controller 810, via the human interface device 850, may provide and display the graphical interface 700 of FIG. 7 and receive user input with respect to the graphical interface 700.

Figure 9:
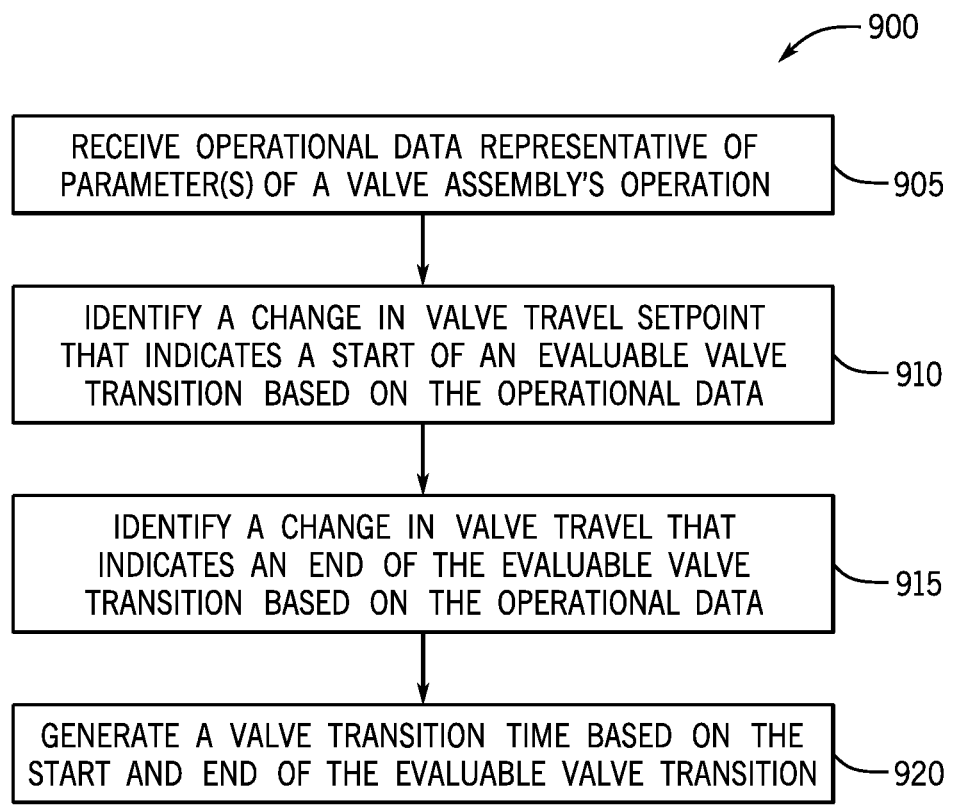
FIG. 9 is a flowchart that illustrates a process for monitoring a valve assembly in accordance with an aspect of this disclosure.

FIG. 9 is a flowchart 900 that illustrates a process for monitoring a valve assembly. For illustration purposes, the flowchart 900 is generally described as being implemented by the monitoring control system 800 of FIG. 8 in the context of the valve assembly 5 of FIGS. 1 and 2 and the valve assembly monitoring system 300 of FIG. 3. However, in other embodiments, other systems may implement the flowchart 900. Additionally, although the blocks of the flowchart 900 are illustrated in a particular order, in some embodiments, one or more of the blocks can be executed partially or entirely in parallel, can be executed in a different order than illustrated in FIG. 9, or can be bypassed.

In block 905, a monitoring control system receives, via an input interface, operational data that is representative of one or more parameters of a valve assembly's operation and that is collected by the valve assembly during normal operation. For example, the electronic controller 810 of the monitoring control system 800 may receive the operational data 70 for one or more valve assemblies 5 via the input/output interface 840. The monitoring control system 800 may receive the operational data 70 directly from one or more of the valve assemblies 5 (e.g., when the monitoring control system 800 is integrated into the control system 302 of FIG. 3) or via one or more intermediary devices. For example, with reference to FIG. 3, when the monitoring control system 800 is integrated into the remote monitoring system 330, the operational data 70 may be provided by one or more of the control system 302 or asset management system 310, as described above. The operational data 70 may, as previously described, include one or more data sets for the respective valve assemblies 5, each of which may indicate one or more of valve position 62, valve position setpoint 60, pneumatic supply pressure 20, pneumatic output pressure 18, and drive signal 64. Each data set may further include one or more of a DVC identifier (indicating the particular DVC 10 from which the data set originated), a data set identifier, and a time stamp 67. The electronic controller 810 may store the received operational data 70 in the memory 830. In some examples, as part of storing the operational data 70, the electronic controller 810 separates and sorts the operational data 70 (see step 402 of FIG. 4), and adds the separated and sorted data to prior data sets for the valve assembly 5 in the memory 830 (see step 404 of FIG. 4).

In block 910, the monitoring control system identifies a change in valve travel setpoint that indicates a start of an evaluable valve transition based on the operational data. For example, the electronic controller 810 may analyze the operational data 70 that was received and stored in the memory 830 to identify a change in the valve travel setpoint 60 that exceeds a threshold. For example, the electronic controller 810 may analyze data sets of the operational data 70 as described with respect to step 408 of FIG. 4. Accordingly, the threshold may be a rate of change threshold for the valve travel setpoint. As described above, the threshold may be set large enough such that, when the threshold is exceeded, it represents a requested valve transition from fully opened to fully closed, from fully closed to fully opened, or to open or close at least a substantial amount (e.g., 60%) that would permit a practical evaluation of valve travel time. Accordingly, the threshold can help ensure that an identified valve transition is an evaluable valve transition. In some examples, the electronic controller 810 may identify the data set of the operational data 70 associated with the identified change in valve travel set point as the start of the evaluable valve transition (see step 412 of FIG. 4). The electronic controller 810 may identify the data set by a data set identifier or time stamp of the data set.

In some examples, the electronic controller 810 may step through data sets of the operational data 70 in sequence to perform the analysis and identification of step 910, such as described with the steps 406, 408, and 414 of FIG. 4. In some examples, the electronic controller 810 further performs a validation function to validate that the identified valve transition is indeed evaluable. Such a validation function is described with respect to step 410 of FIG. 4.

In block 915, the monitoring control system identifies a change in valve travel that indicates an end of the evaluable valve transition based on the operational data. For example, the electronic controller 810 may analyze the operational data 70 received and stored in the memory 830 to identify when a deviation between the valve travel setpoint 60 and the valve travel 62 is less than a threshold. For example, the electronic controller 810 may analyze data sets of the operational data 70 as described with respect to step 422 of FIG. 4. As described above, the threshold may be set small enough such that, when the deviation is below the threshold, it represents that the valve travel 62 is sufficiently close to the travel setpoint 60 for the valve transition (identified as having been started in block 910) to be considered complete. In some examples, the electronic controller 810 may identify the data set of the operational data 70 associated with the identified change in valve travel as the end of the evaluable valve transition (see step 426 of FIG. 4). The electronic controller 810 may identify the data set by an identifier or time stamp of the data set.

In some examples, the electronic controller 810 may step through data sets of the operational data 70 in sequence to perform the analysis and identification of step 915, such as described with the steps 416, 422, and 424 of FIG. 4. In some examples, while stepping through the data sets, the electronic controller 810 further performs a stability check function to verify that the travel setpoint 60 of each data set is stable (e.g., before determining whether the deviation is below the threshold). Such a function is described with respect to step 418 of FIG. 4.

In block 920, the monitoring control system generates a valve transition time based on the start of the evaluable valve transition indicated by the change in valve travel setpoint and the end of the evaluable valve transition indicated by the change in valve travel. For example, the electronic controller 810 may generate the valve transition time by determining a time difference between a time stamp for the start of the evaluable valve transition (as determined in block 910) and a time stamp for the end of the evaluable valve transition (as determined in block 915). An example of such a determination is described with respect to step 428 of FIG. 4. In the case of the evaluable valve transition representing a full transition (from open to close or close to open), the electronic controller 210 may set the determined time difference to be the valve transition time (see, e.g., step 430 of FIG. 4). In the case of the evaluable valve transition being a partial valve transition, the electronic controller 210 may extrapolate a time for a full valve transition from the determined time difference and set the extrapolated time to be the valve transition time (see, e.g., step 430 of FIG. 4).

In some examples, the electronic controller 810 may store or record the generated valve transition time (e.g., in the memory 830), as discussed with respect to step 432 of FIG. 4. Additionally or alternatively, in some examples, the electronic controller 810 may output the valve transition time to one or more of the human interface devices 850. For example, the electronic controller 810 may cause a display of the human interface devices 850 to visually depict the valve transition time. For example, the electronic controller 810 may cause the valve transition time to be displayed on a user interface of a display as the valve transition times are displayed on the graphical interface 700 of FIG. 7. In some examples, the electronic controller 810 causes one or more of the human interface devices 850 to indicate the valve transition time in another manner, such as audibly via a speaker or via a different display technique.

In some examples, the electronic controller 810 assesses or analyzes the valve transition time generated in block 920. For example, the electronic controller 810 may compare the valve transition time to one or more anomaly thresholds. In response to the valve transition time exceeding one or more of the anomaly thresholds, the electronic controller 810 may generate an anomaly indication. The anomaly indication may indicate an anomaly for the valve assembly 5, which may indicate a degradation of the valve assembly 5. The one or more anomaly thresholds may include the abnormal limit (as described with respect to step 434 of FIG. 4) as well as the critical limit (as described with respect to step 436 in FIG. 4). Accordingly, when the electronic controller 810 determines that the valve transition time exceeds an abnormal limit (an example anomaly threshold), the electronic controller 810 may generate an anomaly indication. This anomaly indication may include one or both of a recordation of an abnormal alert (e.g., in the memory 830) and an output of the abnormal alert (e.g., via the human interface devices 850), such as described with respect to block 438 of FIG. 4. Additionally, when the electronic controller 810 determines that the valve transition time exceeds a critical limit (another example anomaly threshold), the electronic controller 810 may also generate an anomaly indication. This anomaly indication may include one or both of a recordation of a critical alert (e.g., in the memory 830) and an output of the critical alert (e.g., via the human interface devices 850), such as described with respect to step 440 of FIG. 4. For example, the anomaly indication, whether in the form of an abnormal alert or critical alert, may be output on a user interface of a display of the human interface devices 850, such as shown in the graphical interface 700 of FIG. 7.

The disclosure is not limited in its application to the details of construction and the arrangement of components set forth in this description or illustrated in the accompanying drawings. The disclosure is capable of other embodiments and of being practiced or of being carried out in various ways. Also, it is to be understood that the phraseology and terminology used herein is for the purpose of description and should not be regarded as limiting. The use of "including," "comprising," "containing," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

The term "article of manufacture" as used herein is intended to encompass a computer program accessible from any computer-readable device, carrier (e.g., non-transitory signals), or media (e.g., non-transitory media). For example, non-transitory computer-readable media can include but are not limited to magnetic storage devices (e.g., hard disk, floppy disk, magnetic strips, and so on), optical disks (e.g., compact disk ("CD"), digital versatile disk ("DVD"), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network ("LAN"). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The provided detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

While the invention herein disclosed has been described in terms of specific embodiments and applications thereof, numerous modifications and variations could be made thereto by those skilled in the art without departing from the scope of the invention set forth in the claims.

What is claimed is:

1. A valve assembly monitoring system, the system comprising:
    a valve driver configured to control a position of a valve; and
    a monitoring control system including an input interface, an electronic processor, and one or more memories storing instructions executable by the electronic processor, the monitoring control system further configured to:
        receive operational data, via the input interface, that is representative of one or more parameters of operation of a valve assembly, the operational data being collected by the valve assembly during normal operation;
        identify, based on the operational data, a change in valve travel setpoint that indicates a start of an evaluable valve transition;
        identify, based on the operational data, a change in valve travel that indicates an end of the evaluable valve transition;
        generate a valve transition time based on a time differential between the start of the evaluable valve transition, indicated by the change in valve travel setpoint, and the end of the evaluable valve transition, indicated by the change in valve travel;
        compare the valve transition time to a first time limit, the first time limit being larger than an expected value for the valve transition time;
        compare the valve transition time to a second time limit, the second time limit being larger than the first time limit;
        display a first alert on a user interface device when the valve transition time exceeds the first time limit; and
        display a second alert on the user interface device when the valve transition time exceeds the second time limit.

2. The valve assembly monitoring system of claim 1, further comprising the valve assembly, the valve assembly including:
    the valve;
    a position sensor configured to sense a position of the valve;
    a communication interface; and
    a valve controller, wherein the valve controller is configured to collect the operational data and to communicate the operational data to the monitoring control system via the communication interface.

3. The valve assembly monitoring system of claim 1, wherein, to identify the change in valve travel setpoint that indicates the start of the evaluable valve transition, the monitoring control system is configured to: compare a value of the valve travel setpoint at a first time to a value of the valve travel setpoint at a second time to determine whether a difference between the values of the valve travel setpoint at the first and second times exceeds a threshold.

4. The valve assembly monitoring system of claim 1, wherein, to identify the change in valve travel that indicates the end of the evaluable valve transition, the monitoring control system is configured to: identify a time after the start of the evaluable valve transition at which a difference between a value of the valve travel setpoint and the valve travel is less than a threshold.

5. The valve assembly monitoring system of claim 1, wherein the monitoring control system is further configured to:
    calculate a travel time between the start and the end of the evaluable valve transition;
    determine that the evaluable valve transition represents a transition in position that is less than a full transition of the valve assembly between fully opened and fully closed positions; and
    extrapolate a full transition time for the full transition of the valve assembly based on the travel time, wherein the valve transition time generated by the monitoring control system is the full transition time.

6. A method of monitoring a valve assembly, the method comprising:
    operating a valve driver to control a position of a valve;
    receiving, by an input interface of a monitoring control system including an electronic processor, operational data that is representative of one or more parameters of operation of a valve assembly, the operational data being collected by the valve assembly during normal operation;
    identifying, by the monitoring control system, a change in valve travel setpoint that indicates a start of an evaluable valve transition based on the operational data;
    identifying, by the monitoring control system, a change in valve travel that indicates an end of the evaluable valve transition based on the operational data;
    generating, by the monitoring control system, a valve transition time based on a time differential between the start of the evaluable valve transition, indicated by the change in valve travel setpoint, and the end of the evaluable valve transition, indicated by the change in valve travel;
    comparing the valve transition time to a first time limit, the first time limit being larger than an expected value for the valve transition time;

comparing the valve transition time to a second time limit, the second time limit being larger than the first time limit;
controlling a user interface to display a first alert when the valve transition time exceeds the first time limit; and
controlling a user interface to display a second alert when the valve transition time exceeds the second time limit.

7. The method of claim 6, further comprising:
providing position data, by a position sensor, indicating a position of the valve of the valve assembly to a valve controller of the valve assembly;
collecting, by the valve controller, the operational data based in part on the position data; and
communicating, by the valve controller, the operational data to the monitoring control system.

8. The method of claim 6, wherein identifying the change in valve travel setpoint that indicates the start of the evaluable valve transition includes:
comparing a value of the valve travel setpoint at a first time to a value of the valve travel setpoint at a second time to determine whether a difference between the values of the valve travel setpoint at the first and second times exceeds a threshold.

9. The method of claim 6, wherein identifying the change in valve travel that indicates the end of the evaluable valve transition includes:
identifying a time after the start of the evaluable valve transition at which a difference between a value of the valve travel setpoint and the valve travel is less than a threshold.

10. The method of claim 6, further comprising:
calculating a travel time between the start and the end of the evaluable valve transition;
determining that the evaluable valve transition represents a transition in position that is less than a full transition of the valve assembly between fully open and fully closed positions; and
extrapolating a full transition time for the full transition of the valve assembly based on the travel time, wherein the valve transition time generated by the monitoring control system is the full transition time.

11. A non-transitory computer-readable medium storing computer-executable code, the computer-executable code for causing a computer to:
command a valve driver to control a position of a valve;
receive operational data that is representative of one or more parameters of operation of a valve assembly, the operational data being collected by the valve assembly during normal operation;
identify, based on the operational data, a change in valve travel setpoint that indicates a start of an evaluable valve transition;
identify, based on the operational data, a change in valve travel that indicates an end of the evaluable valve transition;
generate a valve transition time based on a time differential between the start and the end of the evaluable valve transition;
compare the valve transition time to a first time limit, the first time limit being larger than an expected value for the valve transition time;
compare the valve transition time to a second time limit, the second time limit being larger than the first time limit;
generate a first anomaly indication when the valve transition time exceeds the first time limit; and
generate a second anomaly indication when the valve transition time exceeds the second time limit.

12. The non-transitory computer-readable medium of claim 11, wherein the computer-executable code for causing the computer to identify the change in valve travel setpoint that indicates the start of the evaluable valve transition comprises computer-executable code for causing the computer to compare a value of the valve travel setpoint at a first time to a value of the valve travel setpoint at a second time to determine whether the difference between the values of the valve travel setpoint at the first and second times exceeds a threshold.

13. The non-transitory computer-readable medium of claim 12, further comprising computer-executable code for causing the computer to validate the identification of the start of the evaluable valve transition by determining whether a difference between a value of the valve travel setpoint and a value of the valve travel at a third time that is after the first time exceeds a threshold.

14. The non-transitory computer-readable medium of claim 11, wherein the computer-executable code for causing the computer to identify the change in valve travel that indicates the end of the evaluable valve transition comprises computer-executable code for causing the computer to evaluate, in time sequence, the operational data for times after the time that corresponds to the identified start of the evaluable valve transition to identify a first time after the start of the evaluable valve transition at which a difference between a value of the valve travel setpoint and the valve travel is less than a threshold.

15. The non-transitory computer-readable medium of claim 11, wherein the computer-executable code for causing the computer to generate a valve transition time based on the start and the end of the evaluable valve transition comprises computer-executable code for causing the computer to calculate a difference between a first timestamp for a first data set that corresponds to the start of the evaluable valve transition and a second timestamp for a second data set that corresponds to the end of the evaluable valve transition.

16. The non-transitory computer-readable medium of claim 11, further comprising computer-executable code for causing the computer to determine that the evaluable valve transition represents a transition in position that is less than a full transition of the valve assembly between open and closed positions and to calculate a full transition time for the valve assembly based on the calculated travel time.

17. The non-transitory computer-readable medium of claim 11, further comprising computer-executable code for causing the computer to compare the travel time to one or more travel time limits for the valve assembly.

18. The non-transitory computer-readable medium of claim 17, wherein the one or more travel time limits for the valve assembly are based on one or more baseline travel times for the valve assembly.

* * * * *